(12) United States Patent
Witteveen

(10) Patent No.: US 8,333,060 B2
(45) Date of Patent: Dec. 18, 2012

(54) MICRO REACTION TURBINE WITH INTEGRATED COMBUSTION CHAMBER AND ROTOR

(75) Inventor: Gustaaf Jan Witteveen, Molenhoek (NL)

(73) Assignee: Micro Turbine Technology B.V., Breda (NL)

( * ) Notice: Subject to any disclaimer, the term of this patent is extended or adjusted under 35 U.S.C. 154(b) by 595 days.

(21) Appl. No.: 12/108,748

(22) Filed: Apr. 24, 2008

(65) Prior Publication Data

US 2008/0256923 A1 Oct. 23, 2008

Related U.S. Application Data

(63) Continuation-in-part of application No. 11/212,782, filed on Aug. 29, 2005, now abandoned, which is a continuation-in-part of application No. PCT/NL2004/000144, filed on Feb. 26, 2004.

(30) Foreign Application Priority Data

Feb. 28, 2003 (NL) .................................... 1022803

(51) Int. Cl.
*F02C 3/14* (2006.01)
(52) U.S. Cl. ..................................... 60/39.34

(58) Field of Classification Search ................. 60/39.01, 60/39.34, 39.35
See application file for complete search history.

(56) References Cited

U.S. PATENT DOCUMENTS

| 3,969,892 A * | 7/1976 | Stettler et al. .............. 60/39.511 |
| 5,282,356 A * | 2/1994 | Abell ........................... 60/39.35 |
| 5,560,196 A * | 10/1996 | Schlote ........................ 60/39.35 |
| 6,430,917 B1 * | 8/2002 | Platts ........................... 60/39.43 |
| 6,435,420 B1 * | 8/2002 | Kasai et al. .................. 237/12.1 |
| 2003/0033808 A1 * | 2/2003 | Schlote ........................... 60/772 |

FOREIGN PATENT DOCUMENTS

| DE | 43 10 508 | 10/1994 |
| DE | 44 41 730 | 5/1996 |
| FR | 1 185 945 | 8/1959 |
| FR | 2 680 385 | 2/1993 |
| WO | WO 00/39440 | 7/2000 |

* cited by examiner

*Primary Examiner* — Phutthiwat Wongwian
(74) *Attorney, Agent, or Firm* — Young & Thompson

(57) ABSTRACT

When the compressor is a multistage compressor, each compression space includes an inlet arranged in the vicinity of the center axis and an outlet arranged in the vicinity of the outer circumference of the turbine wheel, and there is a connecting conduit between the outlet of a first compressor stage and the inlet of a second compressor stage. The connecting conduit is delimited by a first wall of the space of the first compressor stage and a second wall of the space of the second compressor stage. Each wall can be a friction disk.

11 Claims, 4 Drawing Sheets

MICRO REACTION TURBINE WITH INTEGRATED COMBUSTION CHAMBER AND ROTOR

CROSS REFERENCE TO RELATED APPLICATIONS

This application is a continuation-in-part of co-pending application Ser. No. 11/212,782, filed on Aug. 29, 2005, which is a continuation-in-part of Application No. PCT/NL2004/000144 filed on Feb. 26, 2004, which claims priority of The Netherlands Application No. 1022803 filed on Feb. 28, 2003, the entire contents of which are hereby incorporated by reference.

FIELD OF THE INVENTION

The invention relates to an apparatus for generating mechanical work (power) and thermal energy (heat) from a fuel, on a small power scale (mechanical power order of magnitude 10 W-150 kW).

BACKGROUND

The prior art has disclosed turbines of the type described above. In a gas turbine (Brayton cycle), a gas is compressed in a compressor, heated in a combustion chamber (with the result that the volume of the gas increases) and then expanded in a turbine. The increased volume of gas during expansion results in more expansion work being supplied than the compression work demanded, which results in a net gain in power. In a steam turbine cycle (Rankine cycle), a liquid is pressurized using a pump, evaporated in a boiler and then expanded in a turbine. The difference between compression work and expansion work means that in this case too there is a net power gain, but the phase difference (liquid/gaseous) means that the difference between compression and expansion work is much greater than in a gas turbine cycle.

In both cases, work is delivered in a rotating turbo machine as a result of kinetic energy (motion energy) and potential energy (pressure) of gases being converted into mechanical energy. This principle can be described using an integral angular momentum balance.

The gas (or vapor) exerts forces, which are associated with the local pressure and any changing velocity of the flow medium, on the walls of flow passages (the blades) of the rotating rotor.

In general, at least three loss mechanisms arise during compression and expansion:
1. Leakage of gas (or vapor) through gaps between the moving rotor surfaces and the stationary casing.
2. Impact losses at the transition in the flow from one flow passage to another flow passage.
3. Frictional losses (at passage and rotor walls and internally in the flowing medium).

Leakage losses are associated with gap widths. In view of the finite absolute dimensional accuracy with which moving seals can be designed (also in view of thermal expansion), sealing problems are significant in particular in the case of small overall dimensions of the compressor and turbine rotor.

In addition, collision losses are proportional to the thickness of the partitions between the flow passages (the blade thickness), which likewise become relatively great if the rotor is of a small overall size.

Finally, velocities and the wall surface area increase in relation to the through-flow surface areas in the case of small dimensions.

WO 00/39440 describes a reaction turbine comprising an inlet located in the vicinity of the center axis of the rotation, this inlet actually being divided into a number of inlet passages connected to a number of individual combustion spaces, and outlet passages which extend to the circumference.

WO 90/01625 discloses a rotating combustion chamber, a boundary of which is formed by a water jacket which forms the circumferential boundary through centrifugal effects.

DE 441730 has disclosed a device without compressor.

SUMMARY OF THE INVENTION

In view of the above, according to a first aspect the object of the present invention is to provide an apparatus of the type described above, in which the losses (which are relatively high in particular in the case of small dimensions) are eliminated or greatly reduced. According to a first aspect of the present invention an improvement over the prior art is obtained by:
1. Carrying out the compression, heating and expansion in a single passage, which is closed off with the exception of inlet and outlet openings and does not have to be sealed with respect to the turbine casing.
2. Connecting a compression passage without any bladed transition to a combustion chamber, which in turn is connected without any bladed transition to an expansion passage.
3. Providing the rotor with a premixed gas/air mixture, which is burnt in the rotor.
4. Where possible (in particular downstream of the compressor), keeping the velocities relatively low, with the result that frictional losses are reduced.
5. Running in hot gas with a relatively low viscosity.

On account of the fact that the gas exerts force on the rotor through a combination of momentum and compressive forces, the turbine is in the category of reaction turbines.

The basic embodiment of the invention comprises an apparatus having the above characteristics (1-5), in which a gas/air mixture with a slight excess of air is sucked in, compressed in a compressor wheel, burnt in a combustion chamber which is fixably connected thereto and then expanded in an expansion wheel which is fixably connected thereto.

One characteristic feature of the basic embodiment of the invention is the slight excess of air in the gas/air mixture. The slight excess of air makes it possible to realize a high combustion temperature, which is of benefit to the conversion efficiency (Carnot efficiency).

A further characteristic feature is that the rotor rotates in the expanded combustion gas (which is still of a relatively high temperature), and consequently the wall friction is relatively low.

In conjunction with the above characteristic features, it should be noted here that the basic embodiment of the invention is a high-speed application of a rotating turbo machine. The intended rotational speed is over 50 000 revolutions per minute.

The compression ratio (the compressor final pressure in relation to the starting pressure) is of importance to the effectiveness of the present invention. In the embodiment with a single-stage centrifugal compressor, the pressure ratio and therefore the conversion efficiency is limited. In the present invention, there is provision for the use of a compressor with a plurality of stages, with the kinetic energy of the gas from one stage being recovered and converted into mechanical energy by the transfer momentum in the boundary layer flow to rotor disks. In this way, a compressor stage receives the static pressure supplied from the previous stage, and the kinetic energy of the gas is retained for delivering power.

On account of the fact that the entire rotor rotates at a high circumferential speed, good heat exchange is possible with the hot combustion gases around the rotor. In addition, heat can be exchanged with the casing of the rotor through radiation. These heat-exchanging properties of the rotor make the following particular embodiments possible.

First of all, the thermal energy which is still available in the combustion gases can be used to preheat the compressed gas/air mixture before the latter is burned in the combustion chamber. This recovery of residual heat is known as regeneration. This means that less fuel is required to attain a certain temperature from the combustion chamber, and the efficiency of the gas turbine increases.

A second option for heat exchange with the compressed gas/air mixture is cooling of the gas/air mixture, firstly by radiation from the rotor to the turbine casing, and secondly by cooling of the rotor using relatively cold intake air. By cooling the intake gas/air mixture, it is possible to realize a higher compression ratio, which is of benefit to the thermomechanical conversion efficiency.

A third embodiment, in which the good heat exchange of the rotor with an environment of this type is used is the heating of the medium in the rotor by means of an external heat source. This external heat source may be formed, for example, by a radiation burner or hot gases which are guided past the rotor. This allows the combustion to be carried out in a controlled manner and means that the medium in the rotor does not have to make the combustion itself possible. In this way, it is possible for a gas to be sucked in by the compressor and heated by the external source. It is also possible for a liquid rather than a gas to be sucked in by the rotor, pressurized in the rotor and then heated by the external source in such a manner that it is evaporated. The vapor which is formed can then be expanded in the expansion wheel. This results in a Rankine (steam) cycle. In a similar manner to in the gas turbine cycle, in this case too a regenerated action is possible by using heat from the expanded vapor to preheat the process medium prior to heating by the external heat source.

The invention also relates to a reaction turbine comprising a rotatably mounted turbine wheel with an inlet arranged in the vicinity of its center axis and an outlet arranged in the vicinity of the outer circumference, with a compressor arranged between the said inlet and the said outlet, the said compressor comprising a multistage compressor, each compression space comprising an inlet arranged in the vicinity of the center axis and an outlet arranged in the vicinity of the outer circumference of the turbine wheel, and with a connecting conduit arranged between the outlet of the first compressor stage and the inlet of the second compressor stage. This particular embodiment of the compressor may optionally be used in combination with a (downstream) combustion chamber. The particular embodiment of the combustion chamber described above is not essential to this variant of the compressor. After all, there are known reaction turbine designs which operate without a reaction chamber.

According to an advantageous embodiment of this staged compressor, the connecting conduit is delimited by the walls of the space of the first compressor stage and of the second compressor stage. This causes the gas to move to and fro in zigzag form.

This variant too can be used without the particular embodiment of the combustion chamber described above.

According to a further aspect the invention relates to a reaction turbine comprising a rotatably mounted turbine wheel with an inlet arranged in the vicinity of its center axis and an outlet arranged in the vicinity of the outer circumference, with a compressor and a combustion chamber arranged between the inlet and outlet. In this case, according to the invention, use is made of heat exchanger means, by means of which the heat from the gas which emerges is used to heat the gas which comes out of the compressor and is fed to the combustion chamber, with heat exchange being carried out directly, i.e. with the gas which flows out directly heating, via a heat exchanger, the stream of gas moving out of the compressor. The embodiment of the compressor or combustion chamber is not essential to this variant in which the heat exchange is applied directly.

The invention also relates to a combined heat and power system in which use is made of one of the reaction turbine embodiments described above in combination with an electric generator. The heat which is released is preferably used to heat a building.

BRIEF DESCRIPTION OF THE DRAWINGS

The invention will be described in more detail on the basis of the appended figures, in which.

DETAILED DESCRIPTION

Figure 1A:
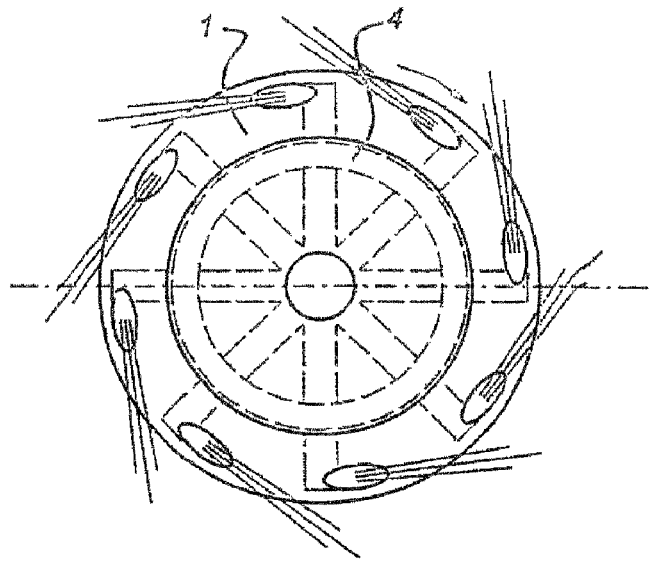
FIG. 1 shows a gas turbine in accordance with the basic embodiment.
Figure 1B:
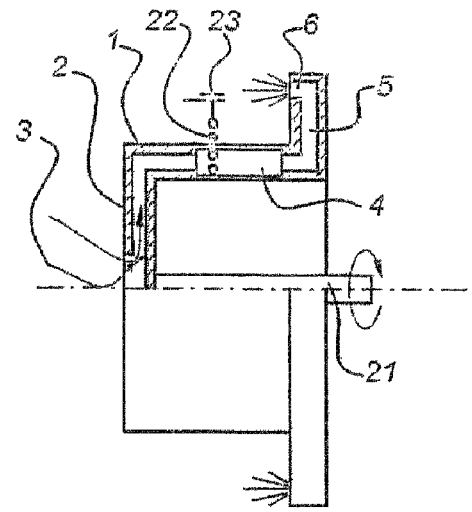

FIG. 1 shows a rotor 1 in the form of its basic embodiment with compressor wheel 2, which sucks in a gas/air mixture through the opening 3. The compression passage 2, in which the pressure of the gas is increased by the centrifugal acceleration acting on the gas stream, is fixedly connected to the combustion space 4, which is designed as a single annular chamber. The initial ignition of the premixed gas/air mixture can be effected by ignition using a spark igniter (spark plug) 22, with the electrical energy being transferred from the casing 23 (also by means of a spark) to the spark plug. The combustion space 4 is also fixedly connected to the expansion wheel 5, in which the hot gases flow out through a jet nozzle 6, imparting a predominantly tangential velocity to the gas jet which flows out. The outgoing flow may be purely tangential (at the rotor circumference) or may include an axial component in the direction of the compressor (as shown) or away from the rotor, or a combination of the above directions.

On account of the fact that the gases flow out with a higher velocity and/or a larger radius with respect to the gases which are sucked in, a net torque is exerted on the rotor 1, which can be used, via an output shaft, to drive a device, for example an electricity generator with a power of, for example, between 10 W and 150 KW. Since the absolute velocity of the medium flowing out represents a loss of kinetic energy, it should be kept as low as possible. With a view to maintaining the angular momentum, this means that a low mechanical torque will be exerted on the rotor. This means that a required mechanical power preferably has to be developed with a low mechanical torque and a high rotor speed. A rotational speed of more than 50 000 revolutions per minute is provided.

Figure 2:
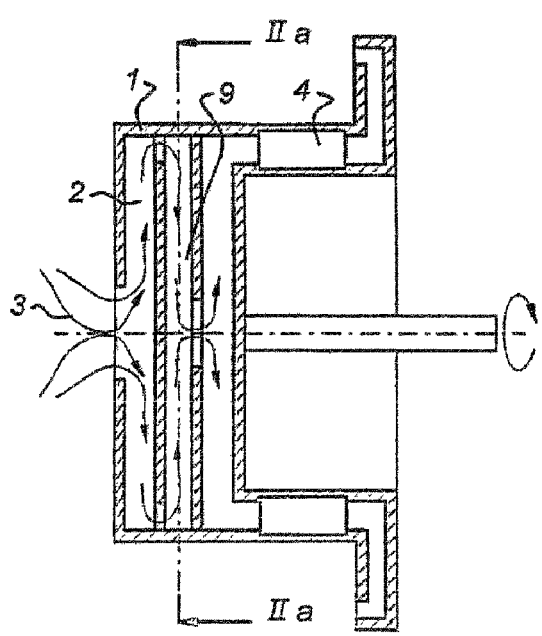
FIG. 2 shows a gas turbine in accordance with the basic embodiment, with a multistage disk compressor.
Figure 2A:
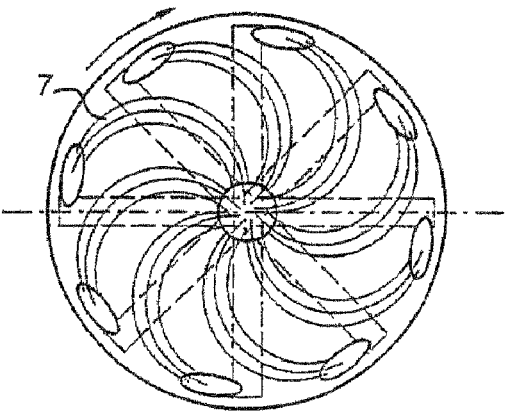

For applications in which a single-stage compressor wheel is insufficient with regard to the increase in pressure, FIG. 2 shows an embodiment with a multistage compressor wheel (in this case a two-stage compressor wheel). In this embodiment of the compressor, after each (centrifugal) compression stage (passage 2), the gas is fed to a momentum regeneration stage 9. The gas (which has a higher tangential velocity component than that of the compressor wheel 2) in this case, as a result of friction in the boundary layers at the disks, transmits tangential momentum to the rotor, with the result that mechanical energy is delivered. Positioning various stages in series results in the static increase in pressure being stacked up, with the result that the pressure ratio increases without the need for an extremely high rotational speed and/or rotor dimension. A particular characteristic of the disk compressor or centrifugal is that the kinetic energy of the gas, after each compression stage, is largely converted into mechanical energy (in the boundary layers at the disks), and is thereby recovered.

Figure 3:
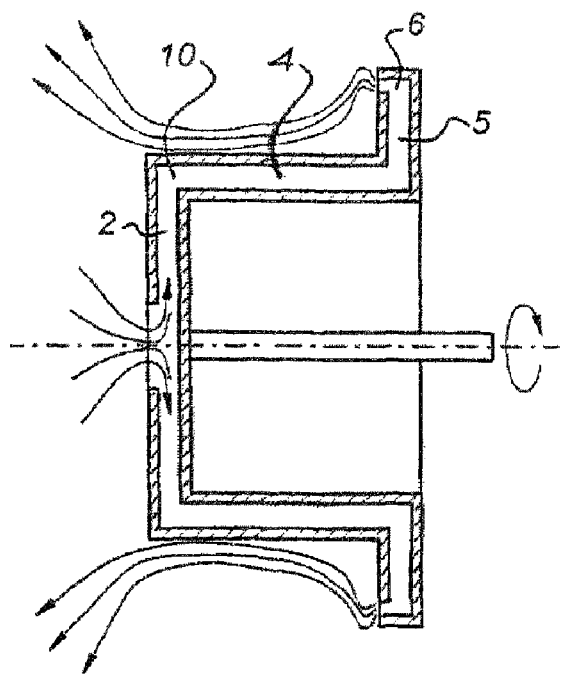
FIG. 3 shows a gas turbine in accordance with the basic embodiment, in which regeneration of residual heat takes place.

FIG. 3 shows the basic embodiment of the turbine, in which the thermal energy which is still present in the outlet gases is used to preheat the compressed gas/air mixture in a regeneration space 10. The regeneration space 10 is connected upstream of and fixedly connected to the combustion space 4. Regeneration of residual heat results in a higher thermodynamic efficiency of the turbine.

Figure 4:
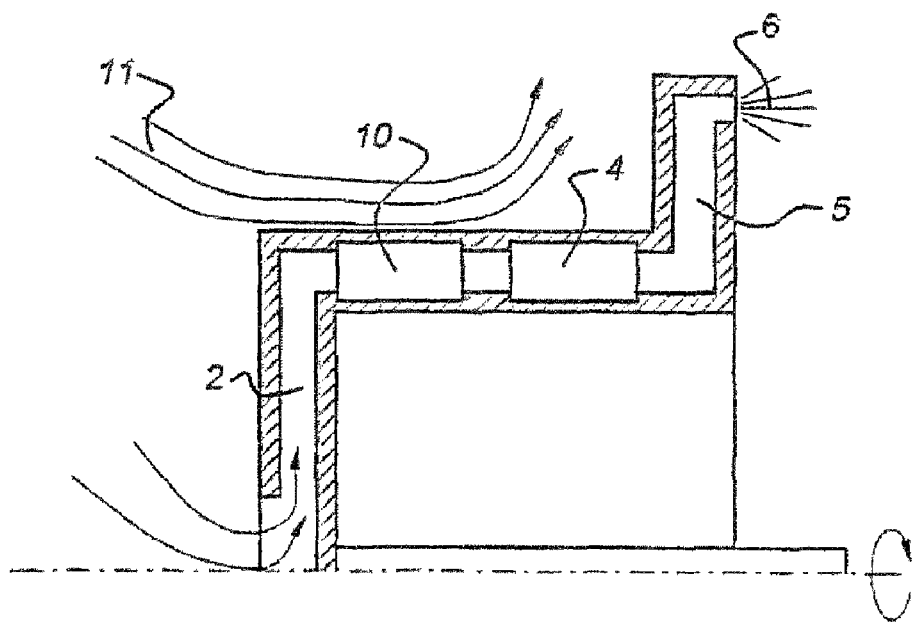
FIG. 4 shows a gas turbine in accordance with the basic embodiment, in which cooling of compressed gas takes place.

FIG. 4 shows an embodiment of the basic configuration in which the compressed gas/air mixture is cooled by a cooling stream 11. Cooling makes it possible to obtain a higher final compression pressure without this being associated with undesirable auto-ignition of the working medium. If the medium is recooled not after but rather during compression in passage 2, an isothermal compression process is approached, which is likewise advantageous for the efficiency of the system. It is known from the field of thermodynamics that a gas turbine cycle with regeneration and isothermal compression and expansion is close to the ideal Carnot cycle.

Figure 5:
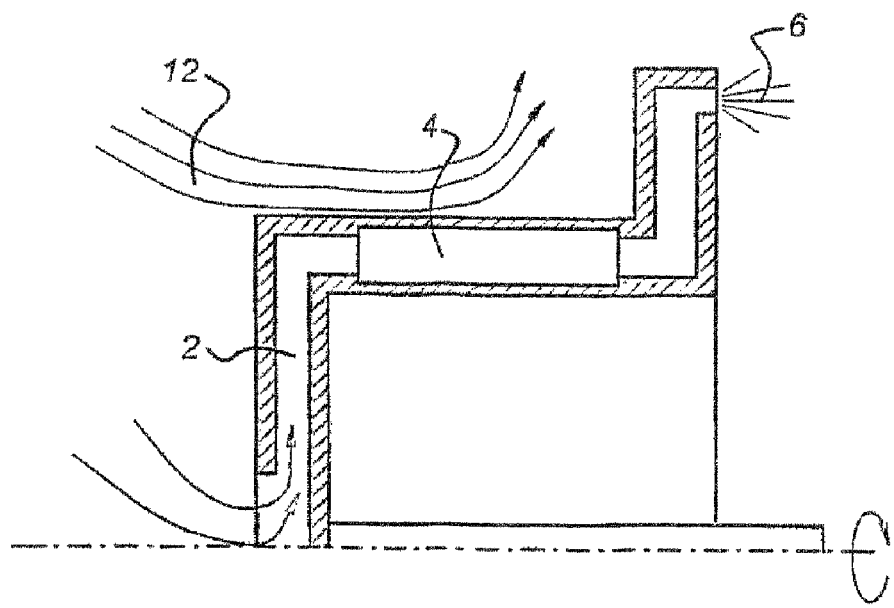
FIG. 5 shows a gas turbine in accordance with the basic embodiment, in which external heating of gas takes place.

As shown in FIG. 5, the compressed gas/air mixture can also be preheated by means of an external heat source 12, which emits heat via the rotor wall to the air in the heating passage 4. External combustion (outside the rotor) gives the advantages that combustion can be better controlled (ignited) and is more stable. Moreover, external combustion is easier to realize, on account of the greater degrees of freedom (in geometry).

Figure 6:
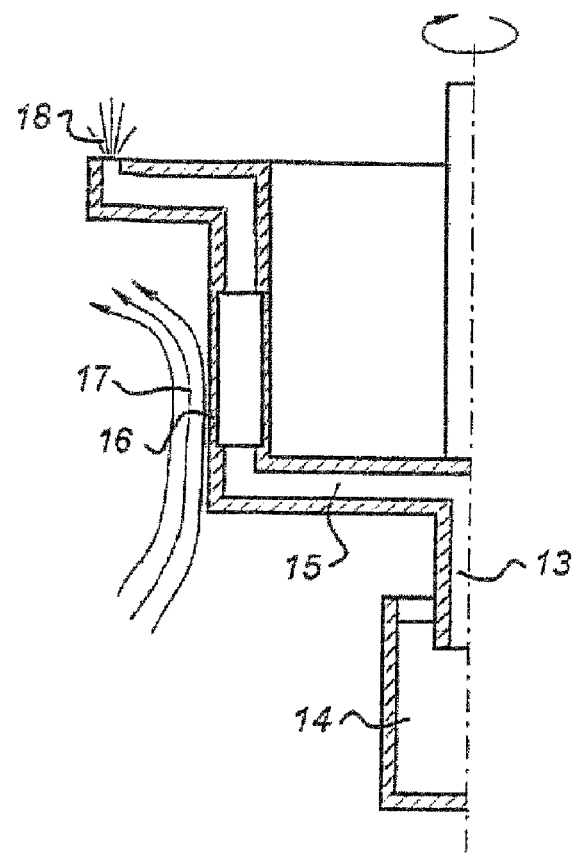
FIG. 6 shows a steam turbine in accordance with the basic embodiment of the gas turbine, with external combustion, integrated liquid pump, evaporator and expansion wheel.

An embodiment with an external heat source working on the basis of a Rankine steam cycle is illustrated in FIG. 6. This embodiment works on the basis of an evaporating liquid. The liquid is sucked out of a liquid feed pipe 14 through a suction pipe 13 and compressed to an elevated pressure in the pump impeller 15. Positioning the axis of rotation vertically means that there is no need for a rotary seal between the rotor and the liquid feed pipe. In the evaporation space 16 which is fixedly connected to the pump passage 15, the liquid is evaporated under the influence of heat which is supplied by an external heat flux 17. The vapor which is formed is expanded into the surroundings in the jet nozzles 18, in this way transmitting its momentum to the rotor. The advantage of the Rankine cycle is the higher power factor (less compression work required in relation to the expansion work).

Figure 7:
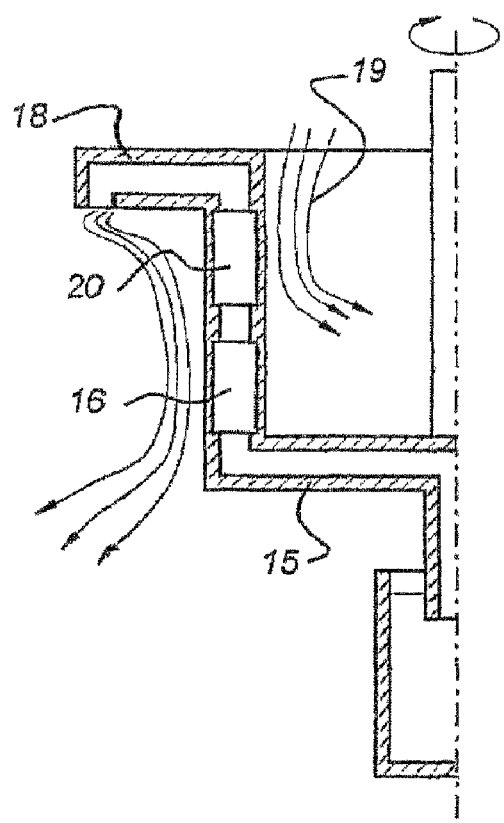
FIG. 7 shows a steam turbine as shown in FIG. 6, in which regeneration of residual heat takes place.

Finally, FIG. 7 shows an embodiment in which the residual heat of the vapor after expansion is reused (regenerated) to preheat liquid prior to thermal energy being supplied by means of the external heat source 19, which in this case is positioned on the hollow rotor wall. As is the case with the gas turbine, the energy efficiency of the system increases as a result of regeneration.

Figure 8:
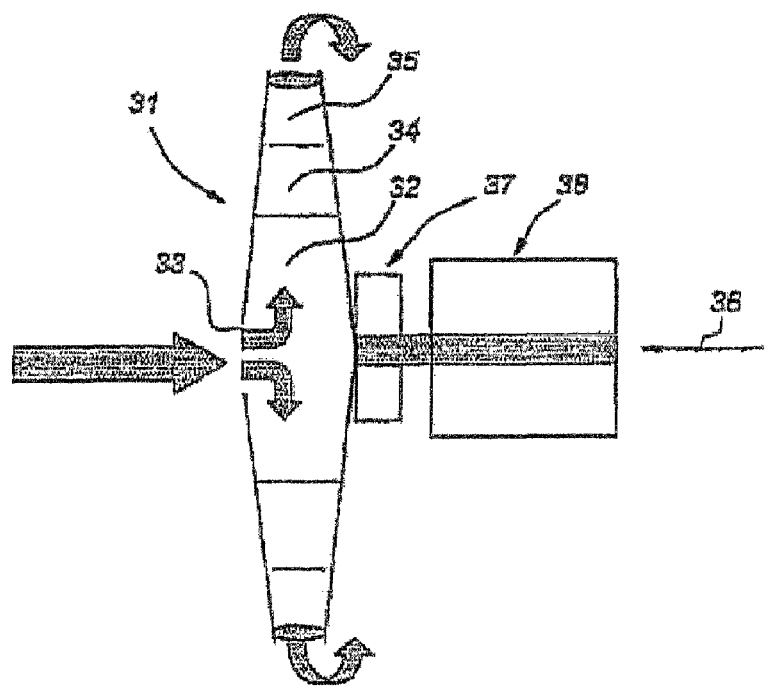
FIG. 8 shows a further embodiment of the invention.

In FIG. 8 a further embodiment of the reaction turbine, more in particular a rotor is generally referred to by 31. Rotor 31 comprises a compressor stage 32 having an inlet opening 33 and a downstream combustion space 34. The turbine is indicated by 35.

It is clear that in contrast to the previous example the various stages are generally spaced from each other and basically there is no displacement in the direction of access 36.

The embodiment according to FIG. 8 might be of interest at relatively high rotational speeds. As example a value is mentioned above 13,000/15,000 rpm. Because there is no displacement in the direction of access 36 after the compression stage there is no need for the air . . . 90° change of direction as in the case of the FIGS. 1 and 2 embodiment.

In FIG. 8 37 indicates a bearing and 38 a generator, which means that the embodiment shown in FIG. 8 is particularly designed to generate heat and rotational energy.

I claim:
1. A reaction turbine, comprising:
a rotatably mounted turbine wheel, said turbine wheel comprising an inlet arranged in a vicinity of the turbine wheel's center axis and an outlet arranged in a vicinity of an outer circumference; and
a compressor having a radial compression passage and a combustion chamber being arranged between said outlet and inlet downstream of the compressor, said combustion chamber and compressor being completely delimited within said turbine wheel, said compressor being fixedly connected to said combustion chamber, said combustion chamber comprising a single open annular chamber, said compressor is a centrifugal compressor and said compression passage has an unbladed transition to said combustion chamber,
wherein the reaction turbine is an all rotating reaction turbine with all parts of the reaction turbine rotating.
2. The reaction turbine as claimed in claim 1, wherein said compressor comprises a multistage compressor, each compressor stage comprising an inlet arranged in the vicinity of the center axis and an outlet arranged in the vicinity of the outer circumference of the turbine wheel, and wherein there is a connecting conduit between the outlet of a first compressor stage and the inlet of a second compressor stage.
3. The reaction turbine as claimed in claim 2, wherein said connecting conduit is delimited by a first wall of a space of the first compressor stage and a second wall of a space of the second compressor stage.
4. The reaction turbine as claimed in claim 3, wherein each wall comprises a friction disk.
5. The reaction turbine as claimed in claim 1, wherein an external diameter of the turbine wheel is less than 200 mm.
6. The reaction turbine as claimed in claim 1, comprising heat exchanger means for heating the gas coming out of the compressor.
7. The reaction turbine as claimed in claim 6, wherein a heat exchanger surface of the heat exchanger means delimits the outlet of the outlet passage of said turbine wheel and the connection between compressor and combustion space.

8. The reaction turbine as claimed in claim 1, comprising heat exchanger means for cooling the gas which is fed to the compressor and/or is compressed.

9. The reaction turbine as claimed in claim 1, wherein said turbine wheel has a rotational axis and said combustion chamber is substantially on a same line perpendicular to said axis as is said compressor.

10. A combined heat and power system, comprising a reaction turbine as claimed in claim 1 and an electric generator.

11. The combined heat and power system as claimed in claim 9, in which there are heat exchanger means connected to a heating system for buildings.

* * * * *